United States Patent
Kawamoto et al.

(10) Patent No.: US 8,279,641 B2
(45) Date of Patent: Oct. 2, 2012

(54) ELECTRIC POWER CONVERSION APPARATUS HAVING FREQUENCY FIXING UNIT TO CONTROL BEAT PHENOMENON

(75) Inventors: Syoichi Kawamoto, Tokyo (JP); Daisuke Ito, Tokyo (JP); Hidetoshi Kitanaka, Tokyo (JP); Keita Hatanaka, Tokyo (JP); Hisanori Yamasaki, Tokyo (JP); Masaki Kono, Tokyo (JP); Takahiko Kobayashi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 334 days.

(21) Appl. No.: 12/602,299

(22) PCT Filed: May 27, 2008

(86) PCT No.: PCT/JP2008/059713
§ 371 (c)(1),
(2), (4) Date: Dec. 30, 2009

(87) PCT Pub. No.: WO2008/149724
PCT Pub. Date: Dec. 11, 2008

(65) Prior Publication Data
US 2010/0128502 A1 May 27, 2010

(30) Foreign Application Priority Data
May 31, 2007 (WO) .................. PCT/JP2007/061062

(51) Int. Cl.
*H02M 5/458* (2006.01)
*H02M 1/12* (2006.01)
(52) U.S. Cl. .......................................... 363/37; 363/41
(58) Field of Classification Search ............... 363/34, 363/37, 39, 40, 41, 95, 97, 98; 318/802, 318/807, 809, 811
See application file for complete search history.

(56) References Cited

U.S. PATENT DOCUMENTS
5,250,890 A * 10/1993 Tanamachi et al. .......... 318/811
(Continued)

FOREIGN PATENT DOCUMENTS
JP 59-169383 A 9/1984
(Continued)

OTHER PUBLICATIONS
Office Action dated Feb. 14, 2011, issued in the corresponding European Patent Application No. 08 764 741.8-2207.
(Continued)

*Primary Examiner* — Adolf Berhane
*Assistant Examiner* — Emily Pham
(74) *Attorney, Agent, or Firm* — Buchanan Ingersoll & Rooney PC

(57) ABSTRACT

An electric power conversion apparatus includes a converter 1 for rectifying ac electric power, a series-connected set, of capacitors 2A and 2B, connected to the dc side of the converter, an inverter 3 for, by setting one end of the series-connected capacitor set to a high-potential level, the other end of the set to a low-potential level, and a connection point between the capacitors to a medium-potential level, selecting any one of the levels and outputting three-phase ac, an inverter control unit 4 for controlling the inverter 3, and a voltage measurement device 8 for measuring a capacitor voltage Vdc as a voltage between both ends of the series-connected set, of the capacitors 2A and 2B; and the inverter control unit 4 further includes a beatless control unit 21 for controlling a modulation factor γ in response to the capacitor voltage Vdc, and a frequency fixing unit 22 for fixing to a command value the frequency of an ac voltage outputted from the inverter 3.

18 Claims, 10 Drawing Sheets

U.S. PATENT DOCUMENTS

| | | | |
|---|---|---|---|
| 5,481,451 | A | 1/1996 | Kuwahara |
| 5,504,667 | A * | 4/1996 | Tanaka et al. .................. 363/37 |
| 5,532,569 | A * | 7/1996 | Tanamachi et al. ........... 318/802 |
| 5,959,430 | A | 9/1999 | Yuki et al. |
| 6,031,738 | A | 2/2000 | Lipo et al. |
| 6,208,109 | B1 * | 3/2001 | Yamai et al. .................. 318/716 |
| 7,710,747 | B2 * | 5/2010 | Matsumoto ..................... 363/35 |
| 2004/0207360 | A1 | 10/2004 | Matsushiro et al. |

FOREIGN PATENT DOCUMENTS

| | | |
|---|---|---|
| JP | 64-77492 A | 3/1989 |
| JP | 1-227693 A | 9/1989 |
| JP | 6-153534 A | 5/1994 |
| JP | 10-271900 A | 10/1998 |
| JP | 11-122944 A | 4/1999 |
| JP | 11-355909 A | 12/1999 |
| JP | 2000-308205 A | 11/2000 |

OTHER PUBLICATIONS

International Search Report for PCT/JP2008/059713 completed Aug. 5, 2008.

Yoshitaka Iwaji et al., "A New PWM Method to Reduce Beat Phenomenon in Large Capacity Inverters with Low-Switching Frequency", Industry Applications Conference, 1997. Thirty-second IAS Annual Meeting, IAS '97., Conference Record of the 1997 IEEE New Orleans, LA, USA Oct. 5-9, 1997, Oct. 5, 1997, pp. 1512-1519, XP010248523, vol. 2, IEEE, New York, NY, USA.

Search Report from European Patent Office issued in Applicant's corresponding European Patent Application No. 08764741.8 dated Jun. 14, 2010.

Office Action (Notice of Preliminary Rejection) dated Mar. 11, 2011, issued in the corresponding Korean Patent Application No. 2009-7020747, and an English Translation thereof.

Office Action dated Oct. 31, 2011, issued in the corresponding Mexican Patent Application No. MX/a/2009/01275, and an English Translation thereof.

Official Action issued by the Chinese Patent Office on Jan. 6, 2012 in corresponding Chinese Patent Application No. 200880017671.1, and English language translation of the Official Action.

Official Action issued by the Japanese Patent Office on Jan. 24, 2012 in corresponding Japanese Patent Application No. 2009-517807, and English language translation of the Official Action.

* cited by examiner

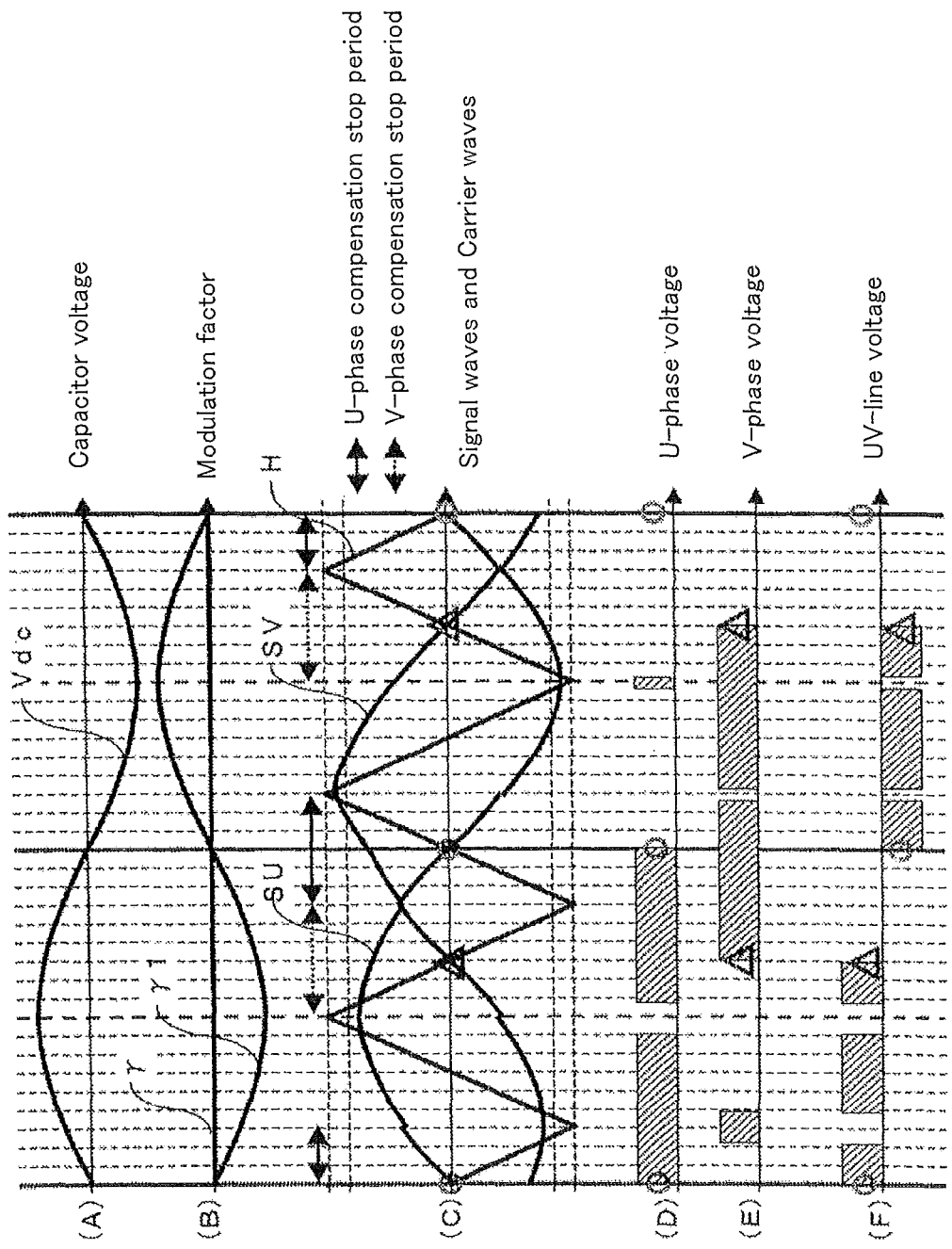

ELECTRIC POWER CONVERSION APPARATUS HAVING FREQUENCY FIXING UNIT TO CONTROL BEAT PHENOMENON

TECHNICAL FIELD

The present invention relates to an electric power conversion apparatus having a converter and an inverter that converts dc electric power outputted from the converter into frequency-variable/voltage-variable ac electric power. Especially, the invention relates to an electric power conversion apparatus by which, when a motor is connected to its output side, motor torque fluctuation due to rectification ripples generated by the converter can be prevented.

BACKGROUND ART

A voltage across a capacitor connected to a dc side of a converter (referred to as a capacitor voltage) includes a ripple component (rectification ripples). Given that the frequency of electric power from a source is f0, the frequency of the ripple component is 2×f0 when the source is single-phase ac, and 6×f0 when the source is three-phase ac.

Because the capacitor voltage is inputted into an inverter, the ac voltage outputted from the inverter also includes the ripple component. When the output frequency of the inverter becomes close to the ripple frequency of the capacitor voltage, due to the differential frequency between them, a beat phenomenon occurs in which ac electric power as output from the inverter and a torque of the motor driven by the inverter fluctuate. The reason for the beat-phenomenon occurrence is attributed to inverter output-voltage amplitude characteristics in which the positive-side characteristic and the negative-side characteristic are not balanced during a cycle.

A method for preventing the beat phenomenon has been considered, in which, in a case of a ripple component being included in the input voltage of the inverter, the operation frequency of the inverter is varied in such a way that the voltage-time integration value for a positive-side half cycle and that for a negative-side half cycle become equal to each other. In this method, the reason for varying the operation frequency of the inverter is that the beat phenomenon occurs at a frequency which is included in a constant-voltage variable-frequency region where the voltage cannot be controlled (for example, referred to as Patent Document 1).

A method for removing or controlling the beat has been also considered in a vector control, in which a phase of a voltage vector is controlled (for example, referred to as Patent Document 2).

By detecting the ripple component of the capacitor voltage, the phase of the detected ripple component is shifted forward, and a voltage value is obtained by summing with a dc component of the capacitor voltage. Thus, a method for controlling a modulation factor using the voltage value has been also considered (for example, referred to as Patent Document 3).

DISCLOSURE OF THE INVENTION

Problems to be Solved by the Invention

In the conventional method for resolving or reducing the beat phenomenon, because the frequency of the voltage outputted from the inverter fluctuates, a problem has occurred when/if applied to speed/velocity control that speed fluctuation increases departing from a command value.

An objective of the present invention is to provide an electric power conversion apparatus by which the beat phenomenon can be resolved or reduced, and secure speed control can also be performed.

Means for Solving the Problem

An electric power conversion apparatus according to the present invention includes a converter for rectifying ac electric power, a series-connected set of capacitors connected to the dc side of the converter, an inverter for, by setting one end of the series-connected capacitor set to a high-potential level, the other end of the set to a low-potential level, and a connection point between the capacitors to a medium-potential level, selecting any one of the levels and outputting three-phase ac, an inverter control unit for controlling the inverter, and a voltage measurement device for measuring a capacitor voltage as a voltage between both ends of the set, wherein the inverter control unit includes a beatless control unit for controlling a modulation factor in response to the capacitor voltage, and a frequency fixing unit for fixing to a command value the frequency of an ac voltage outputted from the inverter.

Advantageous Effect of the Invention

The electric power conversion apparatus according to the present invention includes the converter for rectifying ac electric power, the series-connected set of the capacitors connected to the dc side of the converter, the inverter for, by setting one end of the series-connected capacitor set to the high-potential level, the other end of the set to the low-potential level, and the connection point between the capacitors to the medium-potential level, selecting any one of the levels and outputting three-phase ac, the inverter control unit for controlling the inverter, and the voltage measurement device for measuring the capacitor voltage as the voltage between both ends of the set, wherein the inverter control unit includes the beatless control unit for controlling the modulation factor in response to the capacitor voltage, and the frequency fixing unit for fixing to the command value the frequency of the ac voltage outputted from the inverter; therefore, an effect is obtained that the beat phenomenon can be resolved or reduced, and secure speed control can also be performed.

BRIEF DESCRIPTION OF DRAWINGS

FIG. 4A is a view for explaining a relationship between the signal waves and the carrier waves. FIG. 4B through FIG. 4D are views for explaining output voltages from an inverter 3, in which the U-phase voltage is represented in FIG. 4B, the V-phase voltage is represented in FIG. 4C, and a voltage between U- and V-phase lines is represented in FIG. 4D, respectively.

FIG. 5A is a view representing estimated fluctuation of a capacitor voltage Vdc. FIG. 5B is a view representing time variation of a modulation factor γ and a compensated modulation factor γ1. FIG. 5C is a view for explaining a relationship between the signal waves and the carrier waves. FIG. 5D through FIG. 5F are views for explaining output voltages of the inverter 3, in which the U-phase voltage is represented in FIG. 5D, the V-phase voltage is represented in FIG. 5E, and the UV-line voltage is represented in FIG. 5F, respectively.

FIG. 6A is a view for explaining the estimated fluctuation of the capacitor voltage Vdc. FIG. 6B through FIG. 6D show respective UV-line voltages, VW-line voltages, and WV-line voltages, of which voltages shown upper are for a case without controlling the modulation factor, and those shown lower are for a case controlling the modulation factor.

FIG. 10 is a view for explaining how the electric power conversion apparatus according to Embodiment 2 of the present invention resolves or reduces the beat phenomenon, and also makes the frequency of the ac voltage not to fluctuate. FIG. 10A is a view representing estimated fluctuation of the capacitor voltage Vdc. FIG. 10B is a view representing time variation of the modulation factor γ and the compensated modulation factor γ1. FIG. 10C is a view for explaining a relationship between the signal waves and the carrier waves. FIG. 10D through FIG. 10F are views for explaining output voltages of the inverter 3, in which the U-phase voltage is represented in FIG. 10D, the V-phase voltage is represented in FIG. 10E, and the UV-line voltage is represented in FIG. 10F, respectively.

EXPLANATION OF REFERENCES

1: Converter, 2: Capacitor, 2A: Capacitor, 2B: Capacitor, 3: Inverter, 3A: Inverter, 4: Inverter control unit, 4A: Inverter control unit, 5: Motor, 6: Speed detector, 7U: Ammeter, 7V: Ammeter, 8: Voltmeter,
11: Three-phase/d-q coordinate conversion unit, 12: Voltage command calculation unit, 13: Polar coordinate conversion unit, 14: Slip frequency calculation unit, 15: Adder, 16: Integrator, 17: Adder, 18: Modulation factor calculation unit, 19: Limiter, 20: Gate pulse creating unit, 20A: Gate pulse creating unit,
21: Beatless control unit, 22: Frequency fixing unit, 23: Signal wave generation unit, 24: Carrier wave generation unit, 24A: Carrier wave generation unit, 25: Signal creating unit, 25A: Signal creating unit, 26: Dividing device, 27: Multiplying device, 28U: Switch, 28V: Switch, 28W: Switch, 29U: U-phase compensation necessity determination unit,
29V: V-phase compensation necessity determination unit, 29W: W-phase compensation necessity determination unit, 30U: Sine wave generator, 30V: Sine wave generator, 30W: Sine wave generator,
31U: Multiplying device, 31V: Multiplying device, 31W: Multiplying device,
H: Carrier wave, H1: High-level carrier wave, H2: Low-level carrier wave,
SU: U-phase signal wave, SV: V-phase signal wave, SW: W-phase signal wave,
Vdc: Capacitor voltage, γ: Modulation factor, γ1: Compensated modulation factor.

BEST MODE FOR CARRYING OUT THE INVENTION

Embodiment 1

Figure 1:
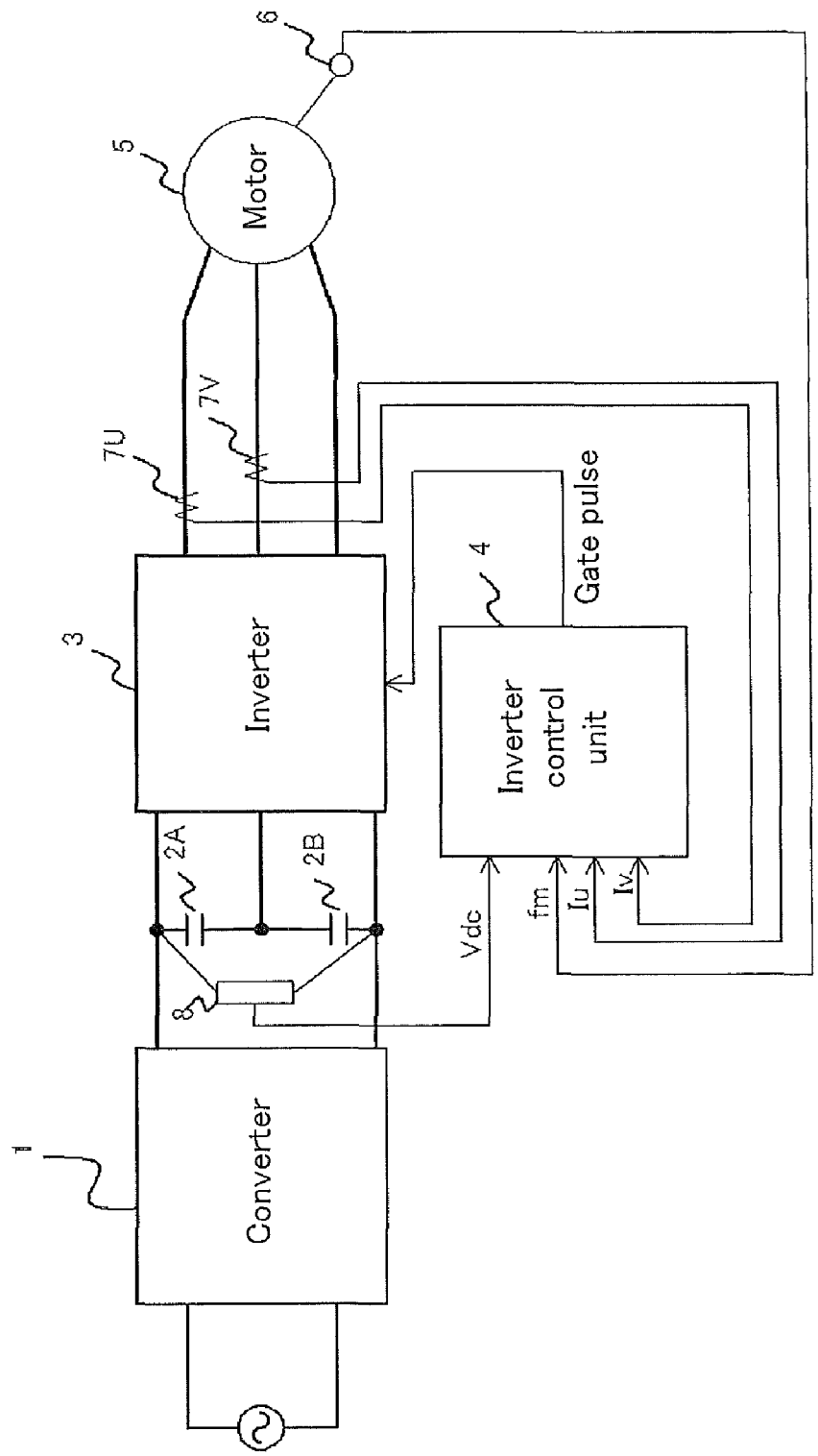
FIG. 1 is a view for explaining a configuration of an electric power conversion apparatus according to Embodiment 1 of the present invention.

FIG. 1 is a view explaining a configuration of an electric power conversion apparatus according to Embodiment 1 of the present invention.

As represented in FIG. 1, the electric power conversion apparatus includes a converter 1 for converting single-phase ac power into dc power, capacitors 2A and 2B connected in series to each other, for storing dc power obtained by rectification by the converter 1, an inverter 3 connected in parallel to the capacitors 2A and 2B, for converting the dc into three-phase ac power of any frequency, and an inverter control unit 4 for controlling the inverter 3. The ac power outputted from the inverter 3 is supplied to a motor 5 as an induction motor.

A rotational frequency fm of the motor 5 is measured by a speed detector 6. A U-phase current Iu and a V-phase current Iv among three-phase ac currents outputted from the inverter 3 are measured by ammeters 7U and 7V, respectively. Using a relational expression representing that the summation of the U-phase, V-phase, and W-phase currents equals zero, the W-phase current is to be calculated; therefore, the W-phase current is not measured. Three-phase currents including the W-phase current may be measured, or alternatively, two-phase currents such as U-phase and W-phase ones, or V-phase and W-phase ones may be measured. What is suitable/sufficient/adequate is to measure at least two of the three-phase components.

The inverter 3 is a three-level inverter device that can output voltages at three potential levels such as a high-potential, a low-potential, and a middle-potential. One end of the capacitors 2A and 2B connected in series to each other is to be a high-potential, the other end is to be a low-potential, and the serially connected point therebetween is to be a middle-potential. Practically, three sets of the serially connected capacitors 2A and 2B are individually provided and distributedly arranged close to the respective phase switching arm of the inverter 3. The three sets of the capacitors are connected so that the potential levels at the respective serial connection points become equivalent to each other. In order to avoid complication of the drawing, only one set of the capacitors 2A and 2B is drawn in the figure. Practically, one set may be applied, and a plurality of, other than three, sets may also be applied. When a plurality of sets is applied, the capacitors are connected so that the potential levels at all serial connection points become equivalent to each other. A voltmeter 8 is provided for measuring a capacitor voltage Vdc which is a voltage between both ends of the connected capacitors 2A and 2B.

The inverter control unit 4 controls the inverter 3 by a vector control method, and also resolves or reduces the beat phenomenon without accompanying fluctuation of the output frequency. At least the capacitor voltage Vdc, the U-phase and V-phase output current Iu and Iv, and the motor rotational frequency fm are inputted into the inverter control unit 4 as represented in FIG. 1. Another measurement value may be inputted thereinto, and the motor rotational frequency fm may be estimated by calculation using Iu and Iv, etc. without inputting the frequency fm.

Figure 2:
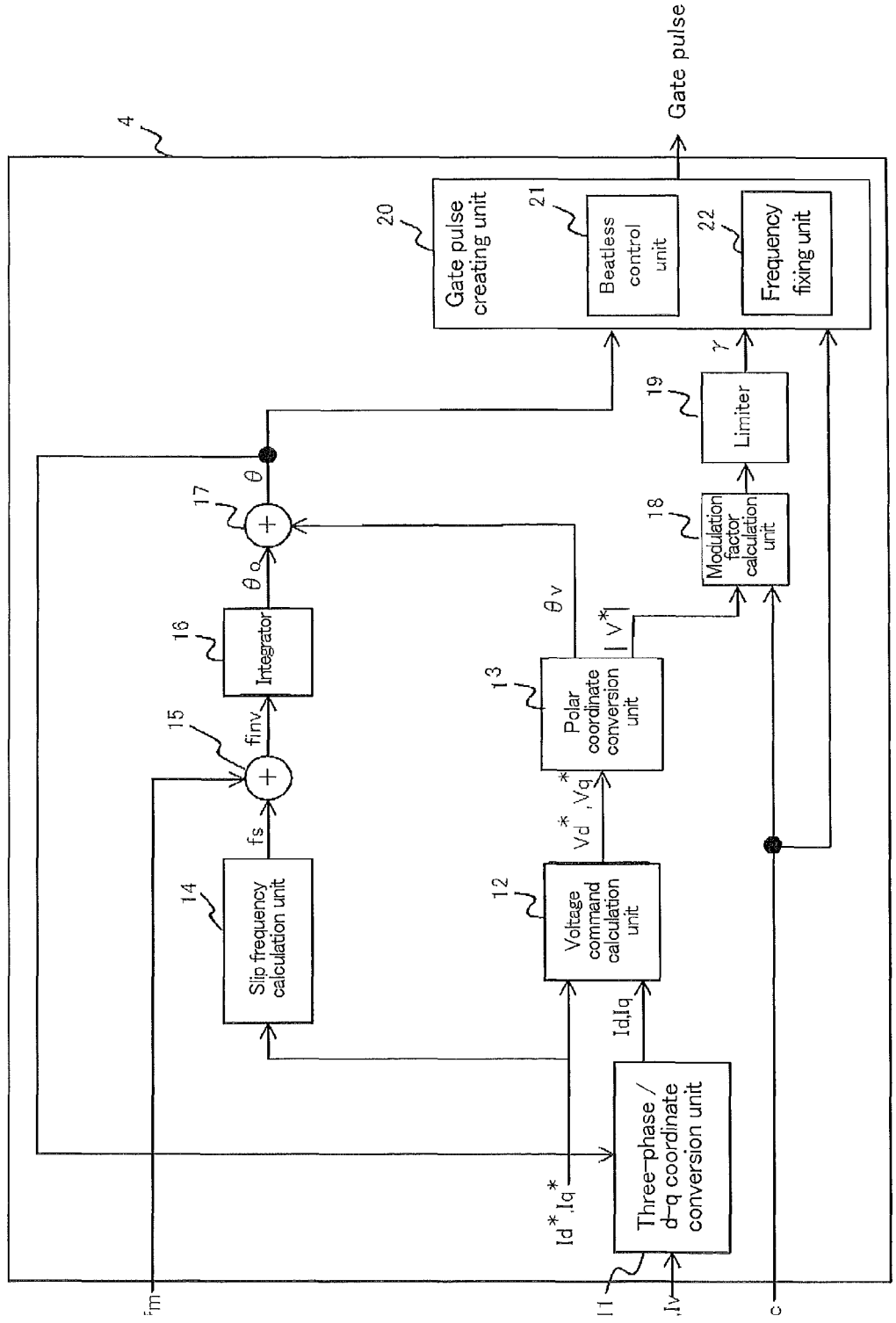
FIG. 2 is a view for explaining an internal configuration of an inverter control unit of the electric power conversion apparatus according to Embodiment 1 of the present invention.

A view for explaining an internal configuration of the inverter control unit 4 is illustrated in FIG. 2. Configuration elements of the inverter control unit 4 are explained as follows. A three-phase/d-q coordinate conversion unit 11 converts Iu and Iv among the three-phase currents into Id and Iq in a d-q coordinate system, and outputs the converted values. Here, a d-axis is an axis rotating with a rotational magnetic flux of a motor, while a q-axis is an axis perpendicular to the d-axis. A voltage command calculation unit 12 calculates Vd* and Vq* as voltage vector command values on the d-axis and the q-axis, respectively, from Id and Iq, using an excitation current command value Id* and a torque current command value Iq* that are separately calculated. The voltage command value vectors Vd* and Vq* in the d-q coordinate system are converted into an amplitude value |V*| and a phase angle θv by a polar coordinate conversion unit 13.

Id* and Iq* are inputted into a slip frequency calculation unit 14, and a slip frequency fs is outputted therefrom. This fs is added to the rotational frequency fm of the motor 5 by an adder 15 where an output frequency finv for the inverter 3 is calculated. By integrating finv using an integrator 16, a phase angle θ0 is calculated. By adding the phase angle θ0 to the voltage-vector phase angle θv using an adder 17, a phase angle θ is calculated. The phase angle θ is a phase angle between the d-q coordinate system and the three-phase coordinate system. The phase angle θ is inputted into the three-phase/d-q coordinate conversion unit 11 where coordinate conversion is performed using the phase angle θ.

The capacitor voltage Vdc and the amplitude value |V*| of the voltage command value vector are inputted into a modulation factor calculation unit 18, and a modulation factor γ0 is outputted therefrom. In the modulation factor calculation unit 18, a dc component Vav is obtained by removing frequency fluctuation components larger than approximately f0 from the capacitor voltage Vdc, and the modulation factor γ0 is obtained by dividing |V*| by Vav. The modulation factor γ0 is inputted into a limiter 19, and the limiter 19 outputs a modulation factor γ whose upper limit is limited below a predetermined value. The maximum value of the modulation factor γ is set to 1. The limiter 19 is adjusted, in a frequency range where beatless control is performed, that the maximum value of the modulation factor is a predetermined one smaller than 1, such as 0.95. The upper limit value by the limiter 19 may be varied depending on the frequency.

The phase angle θ, the modulation factor γ, and the capacitor voltage Vdc are inputted into a gate pulse creating unit 20 from which a gate pulse is outputted for controlling ON/OFF of a switching element included in the inverter 3. The gate pulse creating unit 20 includes a beatless control unit 21 for resolving or reducing the beat phenomenon, and a frequency fixing unit 22 for controlling the frequency of the voltage outputted from the inverter so as not to fluctuate even when the beatless controller 21 operate.

What is differences between the electric power conversion apparatus according to Embodiment 1 and those of the conventional one are that the capacitor voltage Vdc is inputted into the gate pulse creating unit 20, and that the gate pulse creating unit 20 includes the beatless control unit 21 and the frequency fixing unit 22. Regarding the other matters than the above, configurations different from that represented in FIG. 1 and FIG. 2 may be applied.

Figure 3:
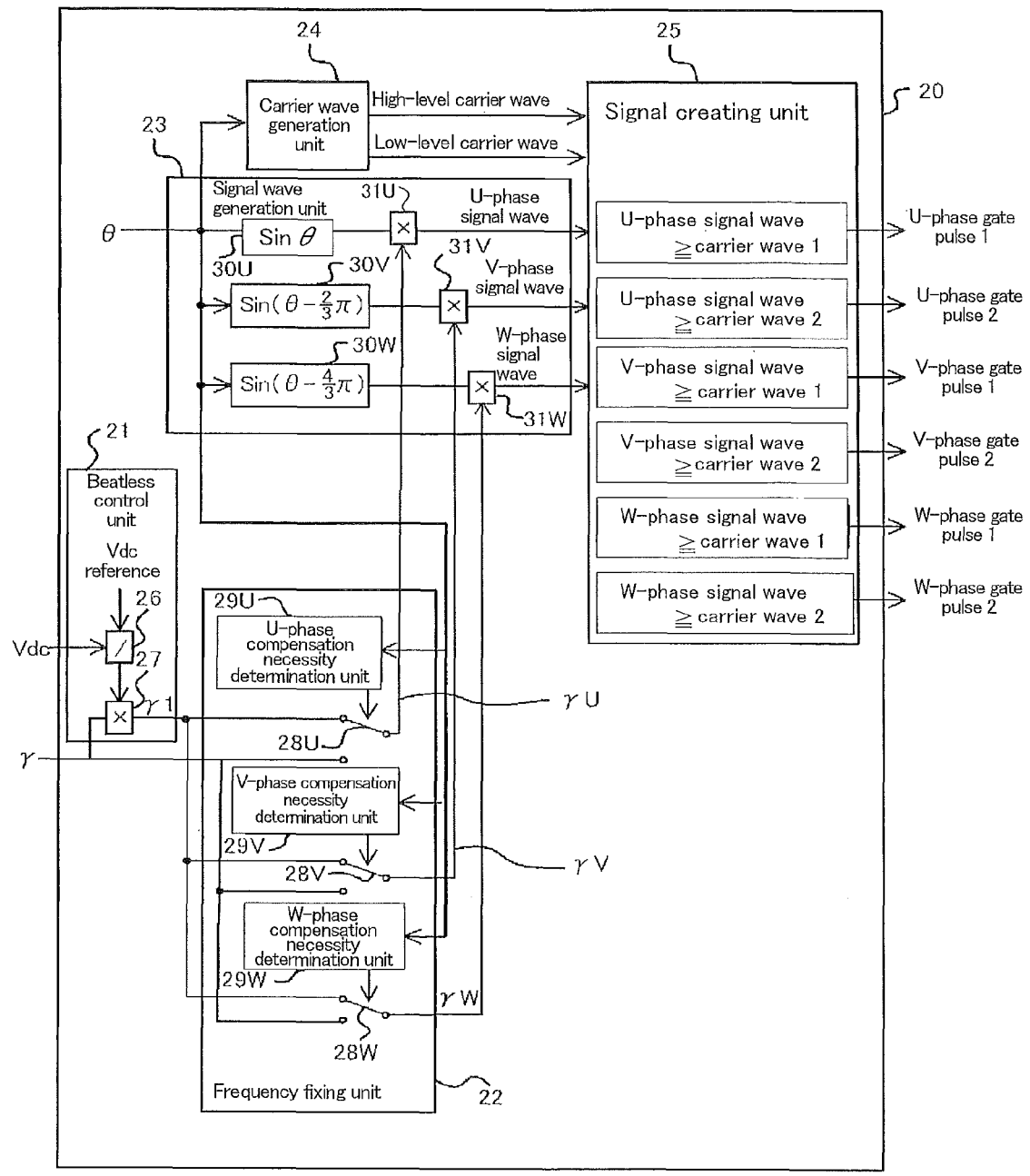
FIG. 3 is a view for explaining an internal configuration of a gate pulse creating unit of the electric power conversion apparatus according to Embodiment 1 of the present invention.

A view is illustrated in FIG. 3 for explaining an internal configuration of the gate pulse creating unit 20. FIG. 3 represents a case with respect to a system for controlling, by comparing the magnitude of a signal wave with that of a carrier wave, gate-pulse start/stop timing. A configuration is illustrated in FIG. 3, where the inverter 3 is operated in a three-pulse mode in the vicinity of a frequency at which the beat phenomenon occurs. Although drawing and description is omitted, a configuration is also included for operating the inverter similarly to the conventional one at a frequency other than the vicinity of the frequency at which the beat phenomenon occurs.

The gate pulse creating unit 20 includes, in addition to the beatless control unit 21 and the frequency fixing unit 22, a signal wave generation unit 23 for generating a signal wave, a carrier wave generation unit 24 for generating carrier waves, and a signal creating unit 25 for creating a gate pulse.

The capacitor voltage Vdc and the modulation factor γ are inputted into the beatless control unit 21 which output a compensated modulation factor γ1, which is a value obtained by dividing a Vdc reference value by Vdc using a dividing device 26 and multiplying the divided value by the modulation factor γ using a multiplying device 27. The compensated modulation factor γ1 is to be inversely proportional to the capacitor voltage Vdc.

The modulation factor γ and the compensated modulation factor γ1 are inputted into the frequency fixing unit 22 which output γ or γ1 in a switching manner at suitable timing for each of the U-phase, V-phase, and W-phase components. Switches 28U, 28V, and 28W are provided in the frequency fixing unit 22, for switching γ or γ1, for each of the U-phase, V-phase, and W-phase components, to output. The outputs by the switches 28U, 28V, and 28W are represented as γU, γV, and γW, respectively. A switching operation of the switch 28U is controlled by the output of a U-phase compensation necessity determination unit 29U, a switching operation of the switch 28V is controlled by the output of a V-phase compensation necessity determination unit 29V, and a switching operation of the switch 28W is controlled by the output of a W-phase compensation necessity determination unit 29W. The phase angle θ is inputted into the U-phase compensation necessity determination unit 29U, the V-phase compensation necessity determination unit 29V, and the W-phase compensation necessity determination unit 29W, and the switches 28U, 28V, and 28W are controlled as follows. Here, the unit of the phase angle is degrees. 180 degrees are equal to radian.

The U-phase compensation necessity determination unit 29U controls the switch 28U as follows. Here, a period for outputting γ1 is referred to as a compensation period, while that for outputting γ is referred to as a compensation stop period.

γU=γ, when −30<θ<30 or 150<θ<210,
γU=γ1, when θ is in the other range.

The V-phase compensation necessity determination unit 29V controls the switch 28V as follows.

γV=γ, when 90<θ<150 or 270<θ<330,
γV=γ1, when θ is in the other range.

The W-phase compensation necessity determination unit 29W controls the switch 28W as follows.

γW=γ, when 30<θ<90 or 210<θ<270,
γW=γ1, when θ is in the other range.

In a predetermined frequency range including the frequency at which the beat phenomenon occurs, the frequency fixing unit 22 changes modulation factor to output the compensated modulation factor γ1 obtained by the beatless control unit 21 during a part of one cycle period as described above. In a frequency range in which the beat phenomenon does not occur, the beatless control unit 21 is made not to operate, or the frequency fixing unit 22 is controlled to output the modulation factor γ all the time. The reason is that, at a frequency higher than that at which the beat phenomenon occurs, it is advantageous for the conversion efficiency of the electric power conversion apparatus, to perform the operation with the modulation factor of 1 as the maximum value. Here, the beatless control unit 21 and the frequency fixing unit 22 may be controlled to operate all the time.

Figure 4:
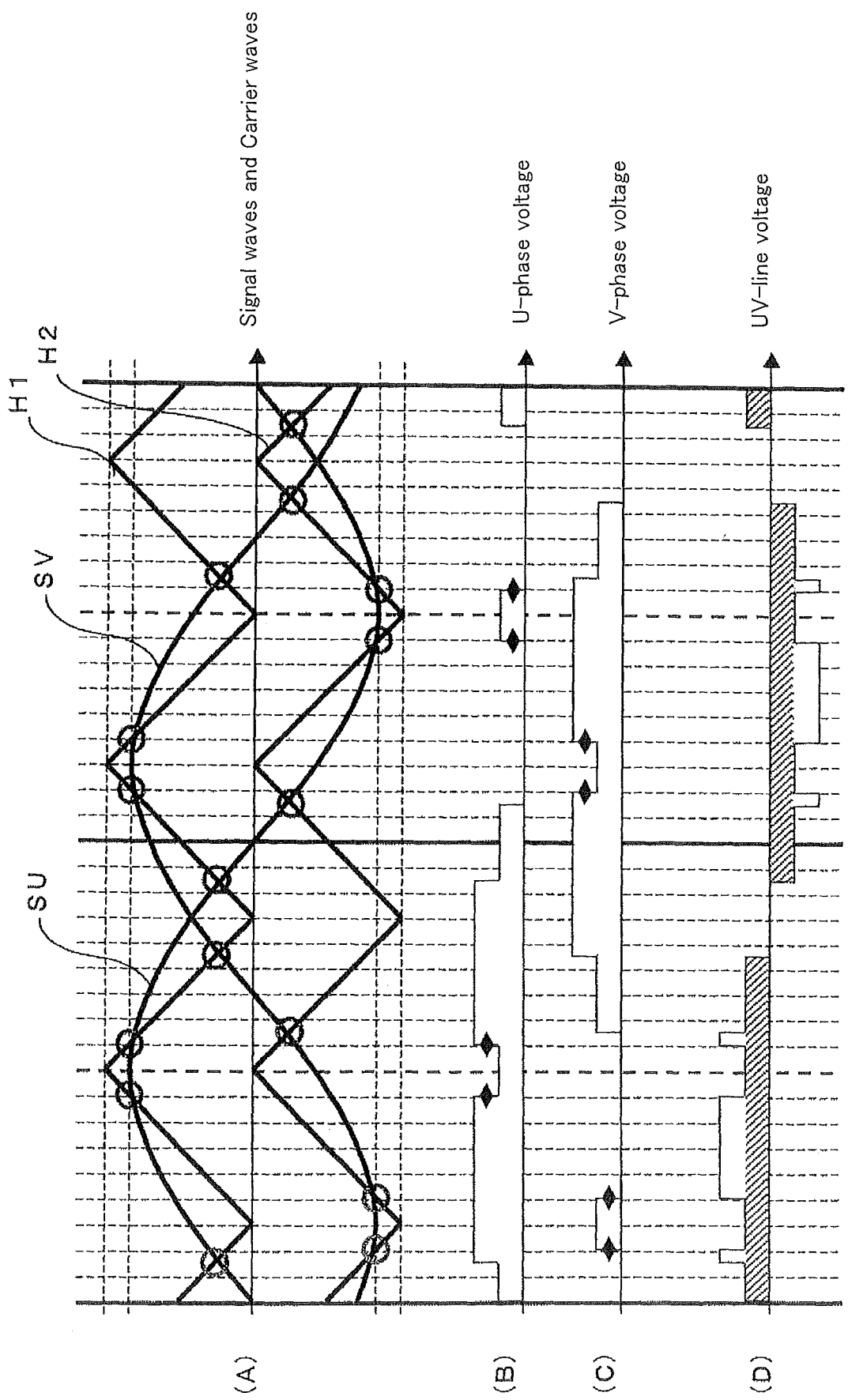
FIG. 4 is a view for explaining a relationship, in a case in which a beatless control unit is not operated, of signal waves, carrier waves, and U-phase and V-phase output voltages of an inverter in the electric power conversion apparatus according to Embodiment 1 of the invention.

The signal wave generation unit 23 includes sine wave generators 30U, 30V, and 30W into which a wave whose phase angle is θ is inputted, and from which respective U-phase, V-phase, and W-phase sine waves having each phase angle of ⅔ radian difference are outputted, and multiplying devices 31U, 31V, and 31W for multiplying the respective sine wave signals by any one of the modulation factors γU, γV, and γW. Outputted signals from the multiplying devices 31U, 31V, and 31W are a U-phase signal wave SU, a V-phase signal wave SV, and a W-phase signal wave SW, respectively. A view is illustrated in FIG. 4 for explaining a relationship, when the beatless control unit is not operated, of the signal waves, the carrier waves, and a U-phase and V-phase output voltages of the inverter 3. FIG. 4A is a view for explaining a relationship between the signal waves and the carrier waves. In FIG. 4A the W-phase signal wave SW is omitted for simplicity. FIG. 4B through FIG. 4D are views for explaining output voltages from the inverter 3, in which the U-phase voltage is represented in FIG. 4B, the V-phase voltage is represented in FIG. 4C, and a voltage between U- and V-phase lines is represented in FIG. 4D, respectively. In FIG. 4A through FIG. 4D, intersections between the signal waves and the carrier waves correspond to the positions where the value changes occur in the U-phase voltage, the V-phase voltage, and the voltage between the U- and V-phase lines. Regarding the line voltage such as the UV-line voltage represented in FIG. 4D, hatching portions located above and below the 0-voltage line are referred to as first-step pulses, and non-hatching portions located above or below the first-step pulses are referred to as second-step pulses.

In the predetermined frequency range including the frequency at which the beat phenomenon occurs, a high-level carrier wave H1 and a low-level carrier wave H2 which are triangle waves whose frequency is double that of the signal waves, are outputted from the carrier wave generation unit 24. The timings when the levels of the high-level carrier wave H1 and the low-level carrier wave H2 become maximum, and those become minimum are coincident with each other, in which the difference between these levels is constant all the time.

The U-phase, V-phase and W-phase signal waves SU, SV and SW each are compared with the high-level carrier wave H1 and the low-level carrier wave H2 in the signal creating unit 25, which outputs gate pulses 1 and 2 for the U phase, V phase and W phase. When the level of the signal wave is higher than that of the high-level carrier wave H1, the gate pulse 1 becomes 1, and in the other case the pulse becomes 0. When the level of the signal wave is higher than that of the low-level carrier wave H2, the gate pulse 2 becomes 1, and in the other case the pulse becomes 0. Corresponding to the state of the gate pulses 1 and 2, following potential signals are outputted from each of phase switching arms of the inverter 3. Here, because of the high-level carrier wave H1>the low-level carrier wave H2 all the time, when the gate pulse 1 is 1, the gate pulse 2 never becomes 0.

(A) when both of the gate pulses 1 and 2 are 1, a high potential signal is outputted.

(B) when the gate pulse 1 is 0, and the gate pulse 2 is 1, a middle potential signal is outputted.

(C) when both of the gate pulses 1 and 2 are 0, a low potential signal is outputted.

FIG. 4B through FIG. 4D show that the above relationships are realized. Here, in FIG. 4B and FIG. 4C, among the transit points at which the U-phase and the V-phase voltages changes, those indicated with rhombic mark mean the points whose timings may vary by the beatless control. The timing is not varied for the points without rhombic mark, that is, the transition points where the voltage changes occur between the high-potential or the low-potential and the middle-potential, in the region where the high-potential and the low potential are adjacent to each other with the middle-potential interposed therebetween. The reason is that, the number of points where the high-potential and the low-potential that sandwich the middle-potential signal are adjacent to each other is only two within a cycle, and by fixing to predetermined values the timings of these two points in relation to the carrier-wave or the signal-wave phase, the fundamental-wave frequency of the ac voltage outputted from the inverter 3 can be fixed.

Figure 5:
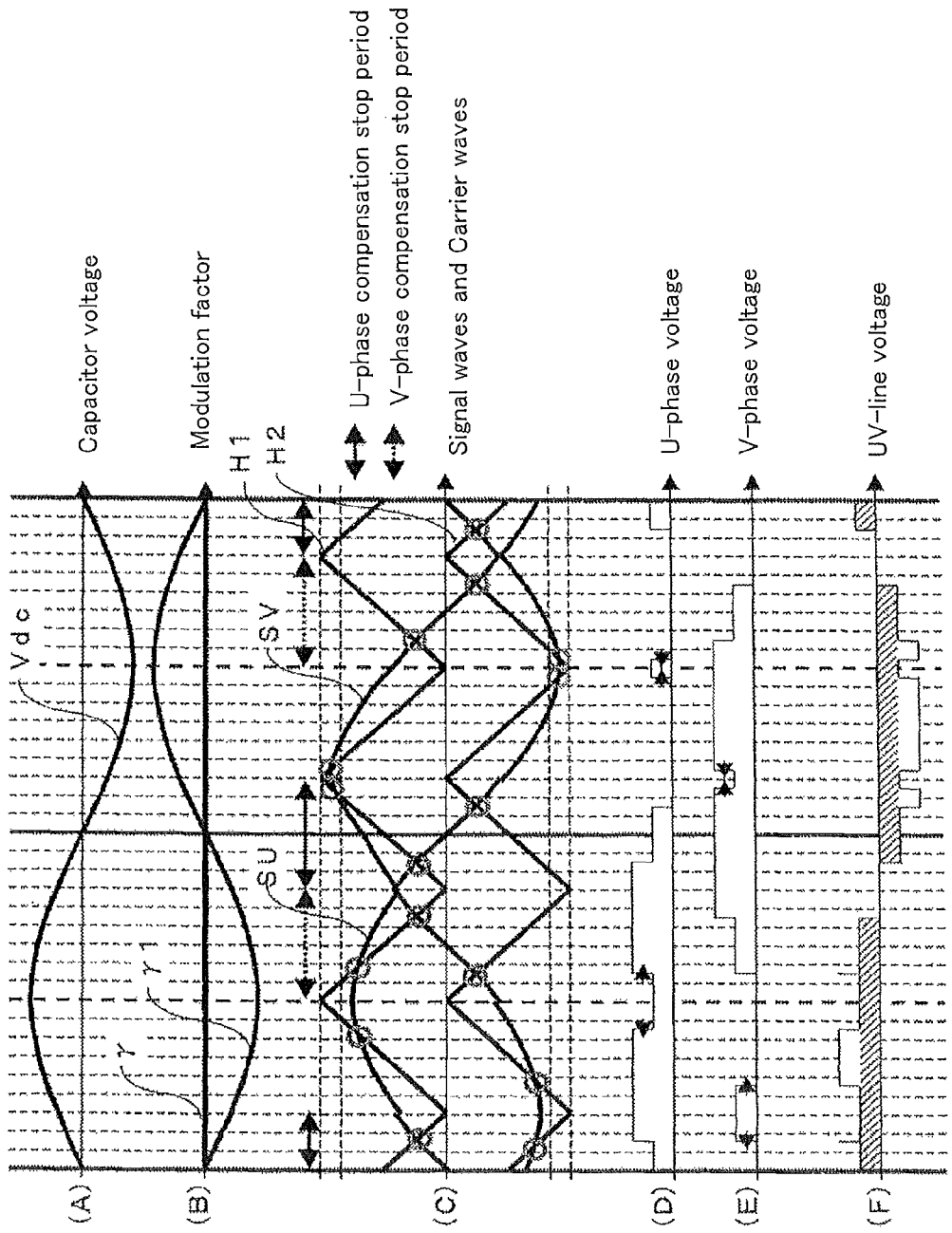
FIG. 5 is a view for explaining how the electric power conversion apparatus according to Embodiment 1 of the present invention resolves or reduces a beat phenomenon, and also makes the frequency of an ac voltage not to fluctuate.

A view is illustrated in FIG. 5 for explaining that the electric power conversion apparatus according to Embodiment 1 of the present invention resolves or reduces the beat phenomenon, and also makes the frequency of the ac voltage not to fluctuate. Estimated fluctuation of the capacitor voltage Vdc is represented in FIG. 5A, and the modulation factor γ and the compensated modulation factor γ1 are represented in FIG. 5B. A view for explaining a relationship between the signal waves and the carrier waves is represented in FIG. 5C. In FIG. 5C, the W-phase signal wave is omitted for simplicity. FIG. 5D through FIG. 5F are views for explaining the voltages outputted from the inverter 3, in which the U-phase voltage, the V-phase voltage, and the UV-line voltage are represented in FIG. 5D, FIG. 5E, and FIG. 5F, respectively.

FIG. 5 represents a case in which the frequency of a ripple of the capacitor voltage Vdc and the frequency of the ac current outputted from the inverter 3 match with each other.

FIG. 5 shows ripple of the capacitor voltage Vdc for one cycle. As represented in FIG. 5A, in the first half of the cycle, the value of Vdc increases and then returns to the reference value, and in the second half of the cycle, the value decreases and then returns the reference value. As represented in FIG. 5B, the modulation factor γ is constant during the cycle shown in the figure. Because the compensated modulation factor γ1 is inversely proportional to the capacitor voltage Vdc, in the first half of the cycle, the value of γ1 decreases and returns to the reference value, and in the second half of the cycle, the value increases and then returns the reference value.

In FIG. 5C, the U-phase signal wave SU and the V-phase signal wave SV discontinuously vary at boundaries between compensation periods and compensation stop periods. The reason is that the modulation factor γ and the compensated modulation factor γ1 are switched to each other at those timings. Regarding the U-phase signal wave SU and the V-phase signal wave SV during the compensation periods, because the compensated modulation factor γ1 is multiplied, the magnitude of the waves in the first half of the cycle is smaller than that in the case of FIG. 4, while is larger in the second half of the cycle. Regarding the U-phase signal wave SU and the V-phase signal wave SV during the compensation stop periods, the magnitude of the waves is equal to that in the case of FIG. 4. Because the magnitude of the U-phase signal wave SU and the V-phase signal wave SV during the compensation periods is different from that in FIG. 4, the timings of the transition points indicated with arrow among the points where the U-phase or the V-phase voltage changes as shown in FIG. 5D and FIG. 5E, move in the respective directions assigned by arrows. As a result, regarding the UV-line voltage represented in FIG. 5F, the width of the second-step pulses narrows during the first half of the period, while widens during the second half of the period. Because the phase-voltage change timing during the compensation stop period, which is determined by the timing at the points where the signal wave and the high-level carrier wave or the low-level carrier wave crosses with each other, does not vary even if the capacitor voltage Vdc varies, the start timing and the end timing of the first-step pulses of the line voltage also do not vary.

Here, the timings where the voltage changes occur between the high-potential and the middle-potential, and between the low-potential and the middle-potential, in the region of each-phase output-voltage pulses where the high-potential and the low-potential are adjacent to each other with the middle-potential interposed therebetween, are determined from the timings of the points where the signal wave crosses the high-level carrier wave or the low-level carrier wave during the compensation stop period. Therefore, the timings where the voltage changes occur between the high-potential and the middle-potential, and between the low-potential and the middle-potential in the region where the high-potential and the low-potential are adjacent to each other with the middle-potential interposed therebetween, are fixed in relation to the phase of the carrier wave or the signal wave, and the interval between the timings where the voltage changes occur between the high-potential and the middle-potential and between the low-potential and the middle-potential is also fixed.

Figure 6:
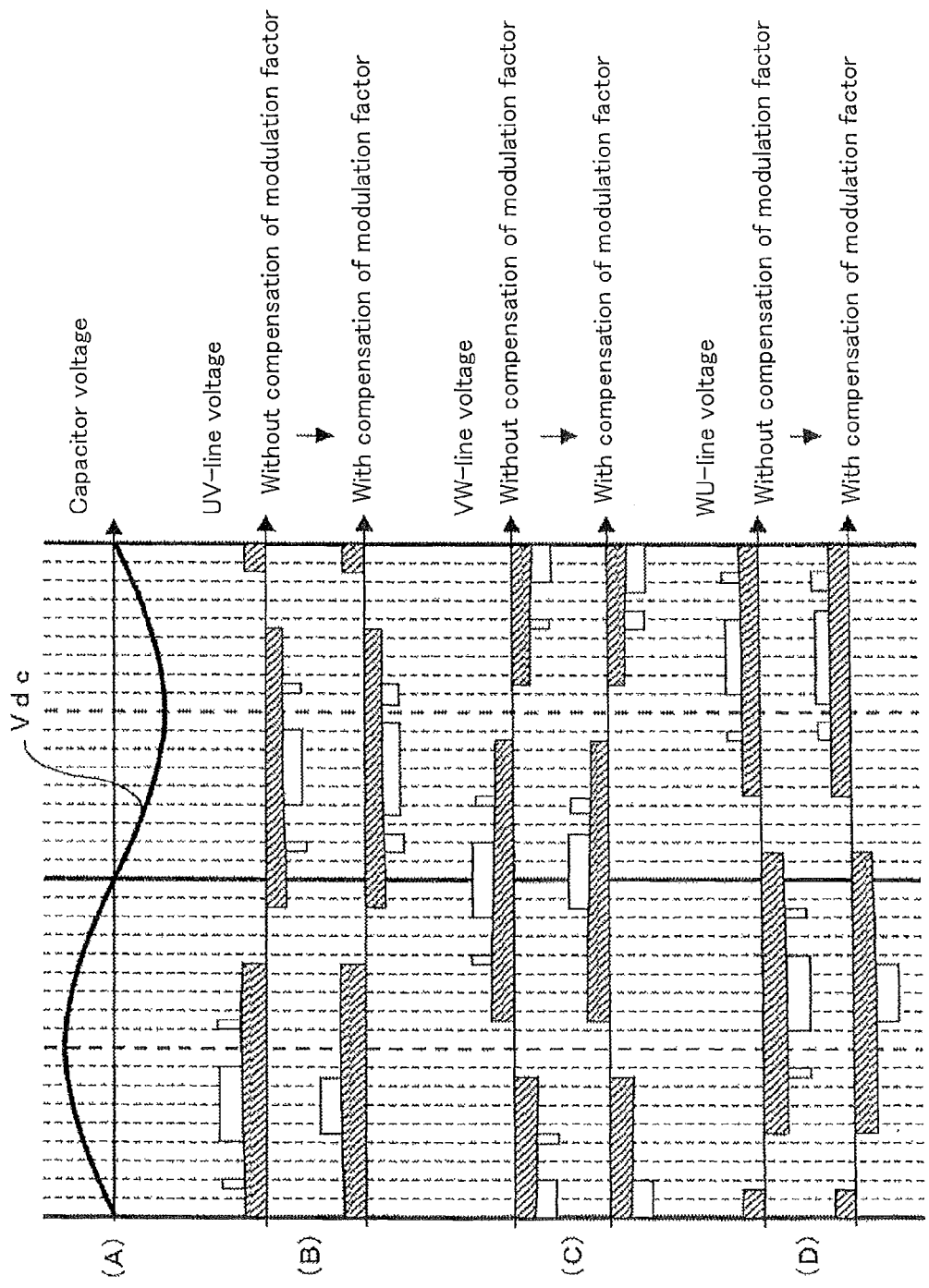
FIG. 6 is a view for explaining difference in UV-line voltage, VW-line voltage, and WV-line voltage, between a case in which the modulation factor is controlled for resolving or reducing the beat phenomenon and a case in which the factor is not controlled.

A view is illustrated in FIG. 6 for explaining difference in UV-line voltage, VW-line voltage and WV-line voltage, between a case in which the modulation factor is controlled for resolving or reducing the beat phenomenon and a case in which the factor is not controlled. FIG. 6A is a view for explaining the estimated fluctuation of the capacitor voltage Vdc, which is the same as FIG. 5A. In FIG. 6B through FIG. 6D, UV-line voltages, VW-line voltages, and WV-line voltages are represented, of which voltages shown upper are for a case without controlling the modulation factor and those shown lower are for a case controlling the modulation factor.

As represented in FIG. 6, the fluctuation of the capacitor voltage Vdc is found to be reflected in the line voltages. Accordingly, in the case of the modulation factor being not controlled, the areas of a portion in which the line voltage is greater than zero and a portion in which the voltage is less than zero are different from each other, for every one cycle of the line voltage; therefore, the beat phenomenon is found to occur. In the case of the modulation factor being controlled, the width of second-step pulses becomes short in line-voltage increasing region, while the width becomes long in line-voltage decreasing region. Accordingly, the difference between the areas of a portion in which the line voltage is greater than zero and a portion in which the voltage is less than zero for every one cycle of the line voltage becomes smaller than the difference in the case of the modulation factor being not controlled; therefore, the beat phenomenon is found to be reduced. Moreover, difference among areas of portions whose line voltages are greater than zero (or less than zero) for every one cycle of the line voltage is also found to be small.

The start timing and the end timing of the first-step pulses do not vary whether the modulation factor is controlled and not controlled, and, even in the case of the modulation factor being controlled, the phase and the frequency of the inverter output voltage are found not to vary. Because the frequency and the phase of the inverter output voltage do not vary, its vector control can be surely and stably performed. This fact means that, when applied to an electric railway car etc., speed fluctuation departing from a command value under speed control can be reduced, and a further secure and stable control can be realized.

This apparatus can be applied to a motor which is not only an induction motor but also a synchronous motor. In the synchronous motor, because its torque is decided by a phase difference between a terminal voltage and an internal electromotive force, no variation of these phases also leads to secure and stable torque controlling.

Because the modulation factor is compensated by dividing by the capacitor voltage, there is no need to provide a device for extracting the ripple of the capacitor voltage or for compensating time delay of ripple detection, which results in a further effect that the number of parts can be reduced. A corresponding voltage to a capacitor voltage used for compensating the modulation factor, may be generated by detecting the ripple and by using the dc component and the ripple component included in the ripple.

Although the method has been explained in which the gate-pulse generation timing is controlled by comparing the magnitude of the signal wave with that of the carrier wave, any other method may be adopted, as long as the beat phenomenon does not occur or can be reduced even if the capacitor voltage fluctuates, and, in addition, such a gate-pulse generation timing can be obtained by which the difference between the frequency and phase of the output-voltage fundamental-wave component and their command value is within an allowable range. For example, the gate-pulse generation timing may be obtained by storing capacitor voltages for the period just before a cycle and basing on the assumption that variation similar to that of the stored capacitor voltages for that period will occurs in the cycle. Moreover, if target values of positive or negative voltages in one cycle and their time integration value for each phase are previously determined, the gate-pulse generation timing may be determined, when the time integration value in one cycle is different from the target value, so that the difference comes close to zero.

Embodiment 2

Figure 7:
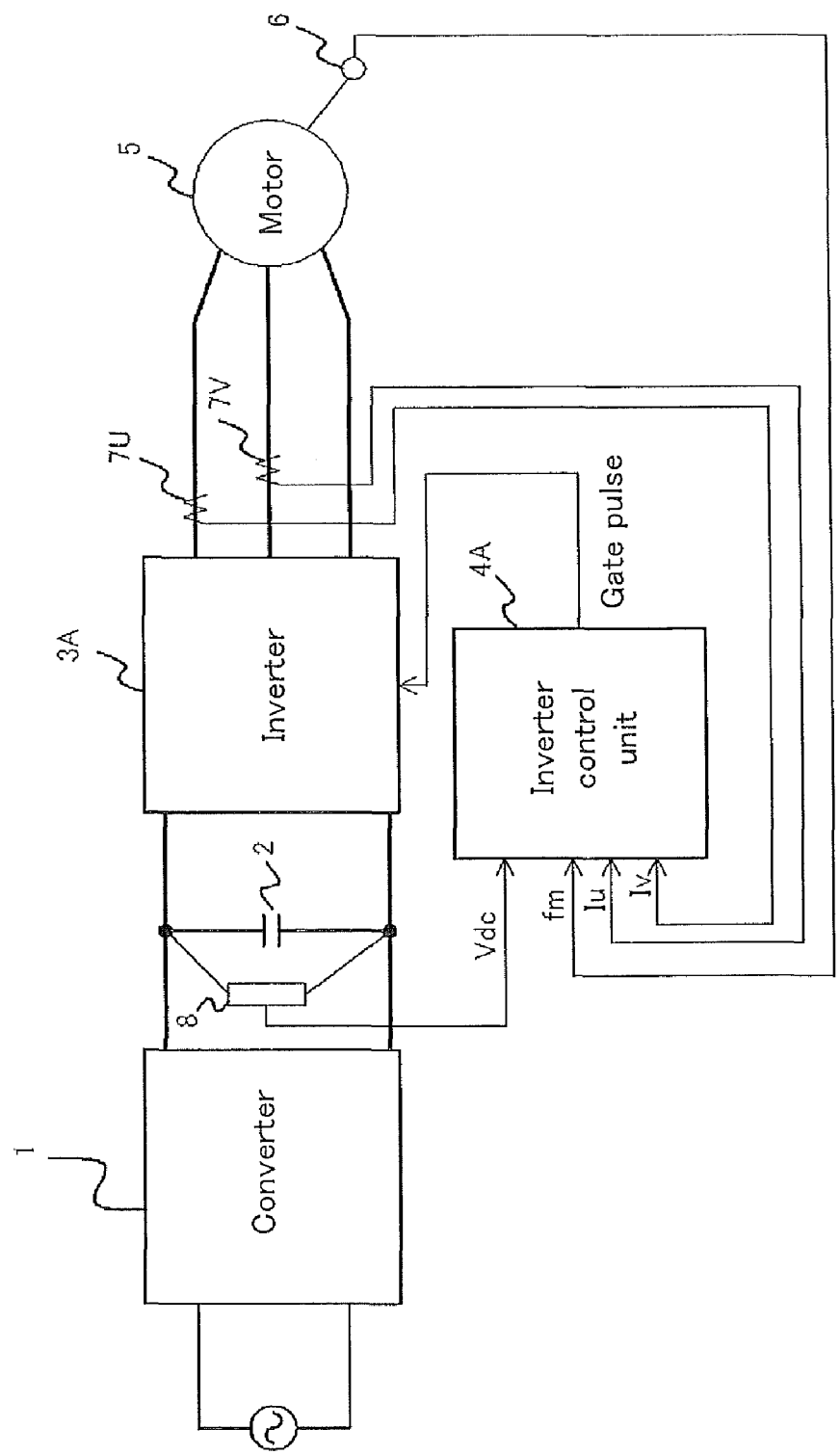
FIG. 7 is a view for explaining a configuration of an electric power conversion apparatus according to Embodiment 2 of the present invention.

FIG. 7 is a view for explaining a configuration of an electric power conversion apparatus according to Embodiment 2 of the present invention. FIG. 7 represents a case of using a two-level inverter. Only points different from those in the case represented in FIG. 1 in which the three-level inverter is used are explained.

A capacitor 2 for storing dc electric power obtained by rectification by the converter 1 is configured with a single capacitor or a plurality of capacitors connected in parallel with each other. One end of the capacitor 2 becomes high potential, while the other end becomes low potential, and the capacitor 2 has no medium-voltage point. An inverter 3A is a two-level inverter for outputting two level potentials such as high potential and low potential.

An inverter control unit 4A controls the two-level inverter 3A, and its input signals are the same as those in Embodiment 1.

Figure 8:
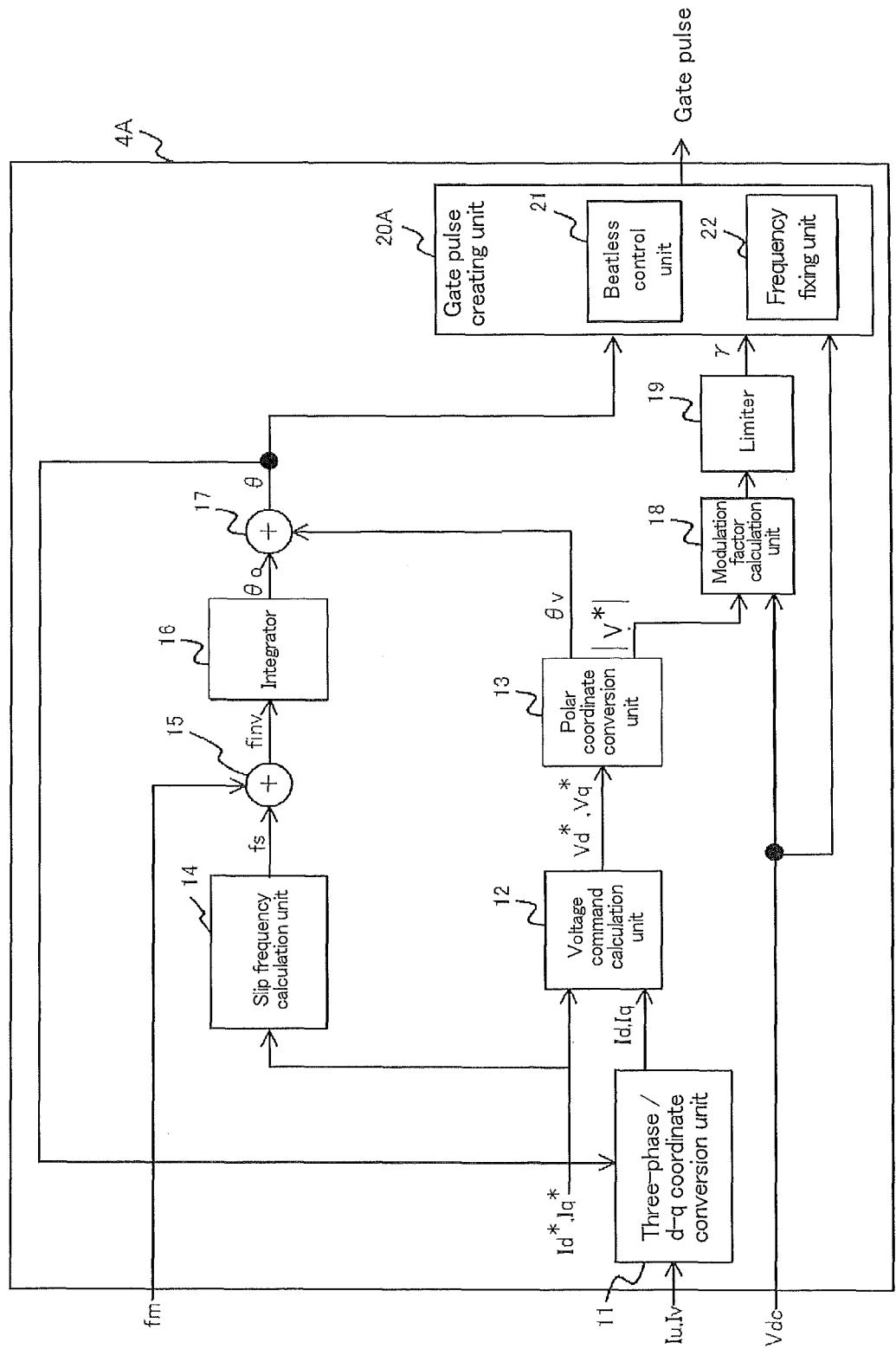
FIG. 8 is a view for explaining an internal configuration of an inverter control unit of the electric power conversion apparatus according to Embodiment 2 of the present invention.

A view for explaining an internal configuration of the inverter control unit 4A is illustrated in FIG. 8. A gate pulse creating unit 20A is provided that is adapted to the two-level inverter 3A.

Figure 9:
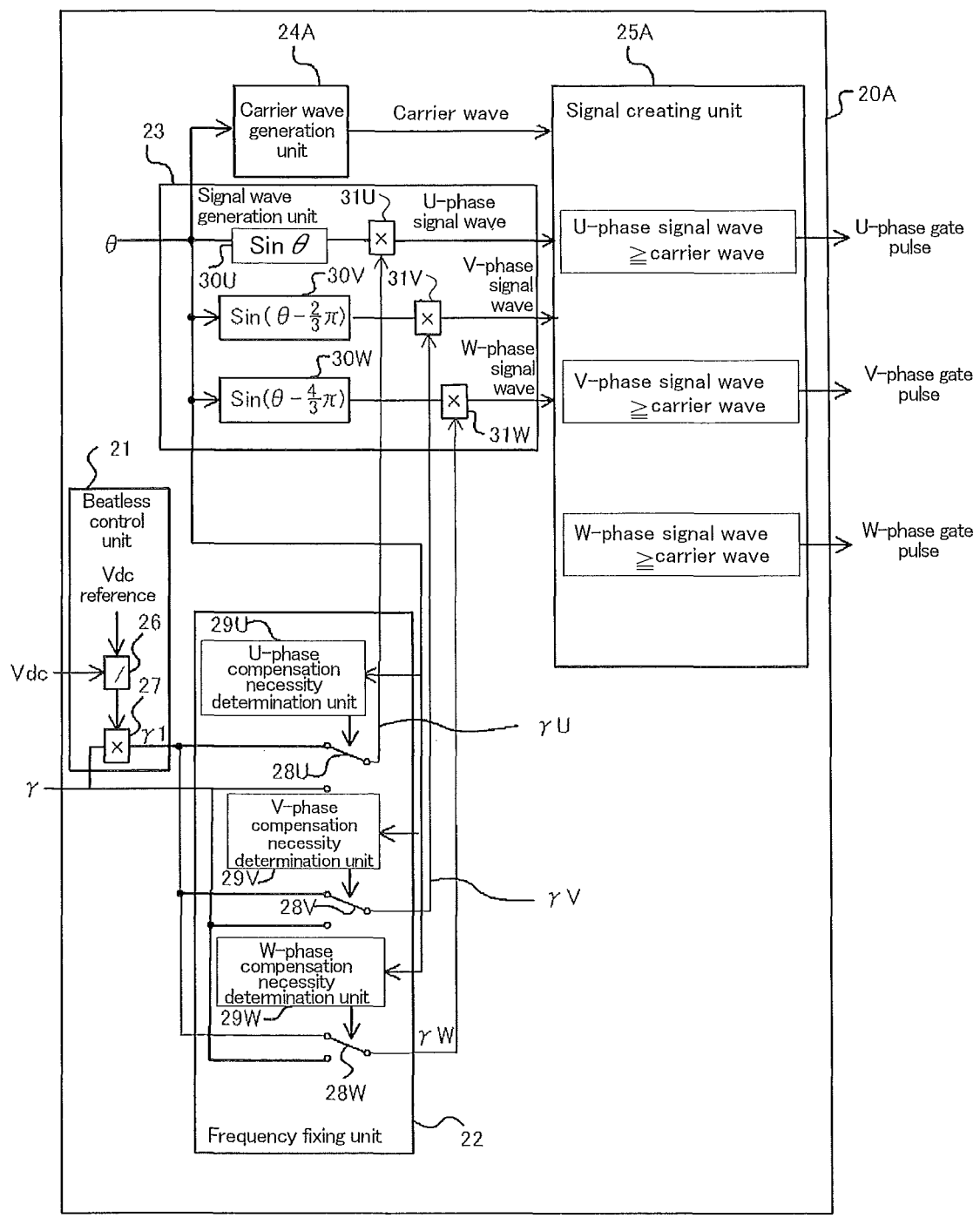
FIG. 9 is a view for explaining an internal configuration of a gate pulse creating unit of the electric power conversion apparatus according to Embodiment 2 of the present invention.

A view for explaining an internal configuration of the gate pulse creating unit 20A is illustrated in FIG. 9. A carrier wave generation unit 24A outputs a single carrier wave. A signal creating unit 25A generates, by comparing the single carrier wave with the U-phase, V-phase and W-phase signal, a U-phase, V-phase and W-phase pulse.

In a predetermined frequency range including a frequency where the beat phenomenon occurs, the carrier wave generation unit 24A outputs a carrier wave H as a triangular wave having a three times higher frequency of the signal wave.

The signal creating unit 25A outputs, by comparing the U-phase, V-phase and W-phase signal wave SU, SV and SW with the carrier wave H, gate pulses with respect to the U phase, the V phase and the W phase. When the magnitude of the signal wave is larger than that of the carrier wave, the value of the gate pulse is "1", while in the other cases the value is "0".

FIG. 10 illustrates a view for explaining how the electric power conversion apparatus according to Embodiment 2 of the present invention resolves or reduces the beat phenomenon, and the frequency of the ac voltage is also made not to fluctuate. FIG. 10A is a view representing fluctuation of the estimated capacitor voltage Vdc. FIG. 10B is a view representing time variation of the modulation factor γ and the compensated modulation factor γ1. Here, FIG. 10A is the same as FIG. 5A, while FIG. 10B is the same as FIG. 5B. FIG. 10C is a view for explaining a relationship between the signal waves and the carrier wave. FIG. 10D through FIG. 10F are views for explaining voltages outputted from the inverter 3, in which the U-phase voltage, the V-phase voltage, and the UV-line voltage are represented in FIG. 10D, FIG. 10E, and FIG. 10F, respectively.

Regarding each of pulses, the voltage is "1" during a period in which each magnitude of the signal waves is larger than that of the carrier wave, while the voltage is "0" during the other period. The timings where both of the signal wave and the carrier wave are "0", for which circular marks are putted in the U-phase data and triangular marks are putted in the V-phase data, does not vary even when the capacitor voltage Vdc fluctuates. The timings where the signal wave and the carrier wave cross with each other near their maximum amplitudes, vary with a fluctuation of the capacitor voltage Vdc. Here, the value of "1" means that the capacitor voltage Vdc is directly outputted as an ac voltage. The value of "0" means that the zero voltage is outputted.

Each of the U-phase and the V-phase pulse has a shape in which the values of "0" and "1" are taken for every half cycle. A period of "1", whose interval fluctuates with the fluctuation of the capacitor voltage Vdc, exists in the vicinity of the center of the period of "0". A period of "0" whose interval fluctuates with the fluctuation of the capacitor voltage, also exists in the vicinity of the center of the period of "1". The periods whose intervals fluctuate become longer when the capacitor voltage Vdc is higher, while become shorter when the capacitor voltage is lower.

The UV-line voltage has a period of the voltage "0" for an electrical angle is approximately 60 degrees for every half cycle, and periods of the voltages "1" and "−1" sandwiching that period of the voltage "0". The start timings of the periods of the voltage "0" with the electrical angle of 60 degrees for each phase, are constant with their interval of 120 degrees. Therefore, the frequency of the UV-line voltage is fixed. Two periods of the voltage "0" exist in a period of the voltage "1" or "−1". The width of these periods varies with a fluctuation of the capacitor voltage. Therefore, the time integration value of the voltage during the period of the voltage "1" is approximately equal to that during the period of the voltage "−1". Accordingly, the beat phenomenon can be reduced.

As described above, even in the two-level inverter, the phase and the frequency of the voltage outputted from the inverter is also found not to vary, when the modulation factor is controlled for reducing the beat phenomenon. Because the frequency and the phase of the voltage outputted from the inverter do not vary, the vector control can be surely and stably performed. This fact means that, when applied to an electric railway car etc., speed fluctuation with respect to a command value when the speed is controlled can be reduced, and a further secure and stable control can be realized.

The configurations represented in the above embodiments each are an example of contents of the present invention, and can be combined with another technology in the prior art, and can also be modified, for example, partially omitted, within a range without departing from the essence of the present invention.

What is claimed is:

1. An electric power conversion apparatus comprising:
 a converter for rectifying ac electric power;
 a capacitor connected to a dc side of the converter;
 an inverter for converting into ac electric power dc electric power stored in the capacitor;
 an inverter control unit for controlling the inverter; and
 a voltage measurement device for measuring a capacitor voltage which is a voltage of the capacitors;
 wherein the inverter control unit comprising a beatless control unit for obtaining a compensated modulation factor by calculating a modulation factor to be inversely proportional to the capacitor voltage, and
 a frequency fixing unit for switching to output the modulation factor or the compensated modulation factor every cycle of a frequency of an ac voltage outputted from the inverted in response to a frequency at which a beat phenomenon occurs, so as to fix to a command value a frequency of the ac voltage outputted from the inverted.

2. An electric power conversion apparatus as recited in claim 1, wherein the frequency fixing unit outputs the compensated modulation factor obtained by the beatless control unit during a part of one cycle period in a predetermined frequency range in which the beat phenomenon occurs, and outputs the modulation factor in a predetermined frequency range in which the beat phenomenon does not occur.

3. An electric power conversion apparatus as recited in claim 1, wherein the frequency fixing unit outputs the modulation factor, for each phase, during predetermined periods in every cycle of a frequency of an ac voltage outputted from the inverter,
 each of the predetermined periods includes a timing at when ac voltage of the phase changes and a line voltage between the phase and another phase changes to a zero value or from a zero value, and
 the timing is such timing either that the line voltage, changing at the timing from a nonzero value of one polarity to a zero value, changes to a nonzero value of the other polarity as first change from the zero value after the timing, or that the line voltage, changing at the timing from a zero value to a nonzero value of one polarity, changes from a nonzero value of the other polarity to a zero value as last change to the zero value before the timing.

4. An electric power conversion apparatus as recited in claim 1, wherein the capacitor consists of a series-connected set of capacitors.

5. An electric power conversion apparatus as recited in claim 2, wherein the capacitor consists of a series-connected set of capacitors.

6. An electric power conversion apparatus as recited in claim 3, wherein the capacitor consists of a series-connected set of capacitors.

7. An electric power conversion apparatus as recited in claim 4, wherein the inverter outputs three-phase ac by selecting a high-potential, a low-potential or a middle-potential, the high-potential represented at one end of the series-connected capacitors, the low-potential represented at the other end of the series-connected set of the capacitors, and the middle-potential represented at a connection point between the capacitors.

8. An electric power conversion apparatus as recited in claim 5, wherein the inverter outputs three-phase ac by selecting a high-potential, a low-potential or a middle-potential, the high-potential represented at one end of the series-connected capacitors, the low-potential represented at the other end of the series-connected set of the capacitors, and the middle-potential represented at a connection point between the capacitors.

9. An electric power conversion apparatus as recited in claim 6, wherein the inverter outputs three-phase ac by selecting a high-potential, a low-potential or a middle-potential, the high-potential represented at one end of the series-connected capacitors, the low-potential represented at the other end of the series-connected set of the capacitors, and the middle-potential represented at a connection point between the capacitors.

10. An electric power conversion apparatus as recited in claim 7, wherein the frequency fixing unit fixes timings of transition points for each phase where the phase voltage changes between the high-potential or the low-potential and the middle-potential, in the region where the high-potential and the low-potential are adjacent to each other with the middle-potential interposed therebetween, to predetermined values in relation to a carrier-wave or a signal-wave phase within a cycle, so as to fix to the command value a fundamental-wave frequency of the each-phase ac voltage outputted from the inverter.

11. An electric power conversion apparatus as recited in claim 8, wherein the frequency fixing unit fixes timings of transition points for each phase where the phase voltage changes between the high-potential or the low-potential and the middle-potential, in the region where the high-potential and the low-potential are adjacent to each other with the middle-potential interposed therebetwen, to predetermined values in relation to a carrier-wave or a signal-wave phase within a cycle, so as to fix to the command value a fundamental-wave frequency of the each-phase ac voltage outputted from the inverter.

12. An electric power conversion apparatus as recited in claim 9, wherein the frequency fixing unit fixes timings of transition points for each phase where the phase voltage changes between the high-potential or the low-potential and the middle-potential, in the region where the high-potential and the low-potential are adjacent to each other with the middle-potential interposed therebetwen, to predetermined values in relation to a carrier-wave or a signal-wave phase within a cycle, so as to fix to the command value a fundamental-wave frequency of the each-phase ac voltage outputted from the inverter.

13. An electric power conversion apparatus as recited in claim 1, wherein the heatless control unit and the frequency fixing unit are operated in a predetermined frequency range in which a frequency capacitor-voltage fluctuation generated according to the rectification by the converter is included.

14. An electric power conversion apparatus as recited in claim 2, wherein the beatless control unit and the frequency fixing unit are operated in a predetermined frequency range in which a frequency capacitor-voltage fluctuation generated according to the rectification by the converter is included.

15. An electric power conversion apparatus as recited in claim 3, wherein the beatless control unit and the frequency fixing unit are operated in a predetermined frequency range in which a frequency capacitor-voltage fluctuation generated according to the rectification by the converter is included.

16. An electric power conversion apparatus as recited in claim 4, wherein the beatless control unit and the frequency fixing unit are operated in a predetermined frequency range in which a frequency capacitor-voltage fluctuation generated according to the rectification by the converter is included.

17. An electric power conversion apparatus as recited in claim 7, wherein the beatless control unit and the frequency fixing unit are operated in a predetermined frequency range in which a frequency capacitor-voltage fluctuation generated according to the rectification by the converter is included.

18. An electric power conversion apparatus as recited in claim 10, wherein the beatless control unit and the frequency fixing unit are operated in a predetermined frequency range in which a frequency capacitor-voltage fluctuation generated according to the rectification by the converter is included.

* * * * *